AUTOMATIC COMMUNICATION CIRCUIT EVALUATION AND SENSORY SYSTEM

Filed March 10, 1967 4 Sheets-Sheet 1

INVENTORS.
NORMAN E. PETERSON
ERNEST E. COURCHENE JR.
BY

ATTORNEY

AUTOMATIC COMMUNICATION CIRCUIT EVALUATION AND SENSORY SYSTEM

Filed March 10, 1967 4 Sheets-Sheet 2

INVENTORS.
NORMAN E. PETERSON
ERNEST E. COURCHENE JR.
BY Norman N. Holland
ATTORNEY

AUTOMATIC COMMUNICATION CIRCUIT EVALUATION AND SENSORY SYSTEM

INVENTORS.
NORMAN E. PETERSON
ERNEST E. COURCHENE JR.
BY Norman N. Holland
ATTORNEY June 23, 1970 N. E. PETERSON ET AL 3,517,125

AUTOMATIC COMMUNICATION CIRCUIT EVALUATION AND SENSORY SYSTEM

Filed March 10, 1967 4 Sheets-Sheet 4

INVENTORS.
NORMAN E. PETERSON
ERNEST E. COURCHENE JR.
BY Norman N. Holland
ATTORNEY 3,517,125

AUTOMATIC COMMUNICATION CIRCUIT EVALUATION AND SENSORY SYSTEM

Norman E. Peterson and Ernest E. Courchene, Jr., Ridgefield, Conn., assignors to Digitech, Inc., Ridgefield, Conn., a corporation of Connecticut Filed Mar. 10, 1967, Ser. No. 622,300
Int. Cl. H04l 25/00
U.S. Cl. 178—69 14 Claims

ABSTRACT OF THE DISCLOSURE

A monitoring system for detecting deteriorating and faulty communications circuits having means for continuously scanning a large number of operating circuits. A sample signal from each of the circuits is analyzed for a variety of parameters or characteristics and these parameters are converted to a common read-out code or language for use to activate an alarm or a print-out circuit either continuously or alternatively only when the parameters indicate a failure or a probable deteriorating condition on the particular line being sampled. The scanning system includes a programming means for connecting an adjustably predetermined time base or other signal characteristic into the signal analyzer for each separate circuit being scanned so that different types of signals can be included. The scanning rate is also coupled to the output of the analyzer permitting the scanning speed to be reduced where trouble is encountered and to be speeded up otherwise.

BACKGROUND OF THE INVENTION

The present invention relates to communications circuit monitoring equipment and more particularly to an automatic system for monitoring communications circuits and for providing immediate alarms for signaling both circuit failures as well as deteriorating signal conditions indicating a possible future failure. The circuit will provide both an alarm and a recording of circuit conditions and it may be used with a large number of circuits having differing signal codes or transmission modes.

A large number of important communication systems including those transmitting typewriter or voice communications and those used in transmitting coded computer signals between spaced computer stations now include hundreds of circuits passing through various common communications or message centers. These centers, whether they are originating stations or relay stations or switching stations or receiving stations or other points, preferably include means for detecting failures or objectionable deterioration of the message transmitting circuits.

DESCRIPTION OF THE PRIOR ART

In view of the importance of the circuits, it is desirable to detect circuit failure promptly to permit immediate repair or signal rerouting. For this reason, various automatic systems are being employed to provide a signal where the circuit signals fail or drop below a predetermined value. These present systems include an appreciable amount of circuitry attached to each communications line being monitored so that the monitoring systems become prohibitively expensive and complicated when used with large numbers of circuits. While satisfactory for smaller signal centers and on less important circuits, these present systems are objectionable both for their complexity and because of their lack of discrimination which causes them to give a large number of false alarms eventually leading maintenance personnel to ignore them. In addition, present systems give an indication of circuit failure without giving useful additional information upon the form and location of the failure.

SUMMARY OF INVENTION

The new system of the present invention has a circuit capable of discriminating between random or intermittent but unobjectionable faults and significant faults and is also adapted for simultaneously reading several circuit parameters and for providing both an alarm when necessary or a continual or intermittent coded output for operating a printer. By this discrimination, the number of false alarms is significantly reduced to the point where the false alarms are substantially eliminated and are not troublesome.

The improved monitoring circuit employs a system for scanning or sampling a large number of circuits and includes a scanning programmer which not only switches the analyzer circuit to the various circuits but which also simultaneously switches on the appropriate time base or other related controls for the particular circuit being scanned so that the system may monitor a variety of circuits having different time bases or conditions.

The scanning programmer also is coupled to the analyzer output in such a manner that circuits having one or more of the measured parameters reading greater than a preset threshold are recycled to provide two or more repeated readings for the defective circuit to assure that the fault sensed by the initial read-out is in fact present. By this means, the scanning time is increased with respect to those circuits on which trouble has been or may be experienced while a regular and more rapid scanning is performed with the remainder of the circuits.

The monitoring system in accordance with the present invention also is particularly adapted for use with a statistical analysis of the system on the monitored circuits and each of the several parameters or reading generated from the monitored signal may be of the type particularly adapted for giving an early indication of circuit deterioration. This pemits the failure of the circuit to be anticipated and to be checked prior to the actual stoppage thereby preventing a costly interruption of that particular circuit. Such statistical samplings or parameters obtained by an analyzer as used in the present circuit may be of the type described in our copending patent application Ser. No. 525,714 filed on Feb. 3, 1966 and owned by the assignee of the present invention.

The new scanning system, particularly used with a scanning programmer as described above, permits a large number of circuits to be monitored as well as permitting one or more points within each circuit to be monitored. This permits a warning signal or a failure signal to be obtained for a precise location so that the monitoring system tells the operator precisely where the failure is occurring and which equipment units or circuit sections have failed or appear to be deteriorating.

Accordingly, an object of the present invention is to provide an improved circuit monitoring system.

Another object of the present invention is to provide a monitoring system capable of detecting both circuit degrading conditions occurring before circuit failure as well as unpredictable and abrupt circuit failures.

Another object of the present invention is to provide a monitoring system for detecting rapidly the precise position within one or more circuits where a degradation or a complete failure occurs.

Another object of the present invention is to provide a monitoring system for communication or other circuits capable of simultaneously reading several predetermined circuit parameters and for converting the parameters to a common code or language for providing a printed readout of the parameters.

Another object of the present invention is to provide a monitoring circuit for reading several circuits parameters and for encoding the readings in a code or language suitable for being fed directly to storage computers or to circuit correction equipment.

Another object of the present invention is to provide a circuit monitoring system for scanning a relatively large number of circuits with a synchronized programming system whereby the monitoring system is coordinated with the signal characteristics such as the transmission rate of each circuit.

Another object of the present invention is to provide a system for monitoring a relatively large number of circuits where the circuits are scanned to permit the monitoring system to measure predetermined parameters on the circuits and where the scanning system includes a programming means for setting the alarm or parameter read-out threshold independently for each of the scanned circuits.

Another object of the present invention is to provide a system for monitoring a relatively large number of circuits and for providing a recorded read-out of circuit parameters and where the scanning process is controlled by the measured parameters so that the scanning may advance rapidly in the absence of signals which may exceed a preset parameter and may advance more slowly when circuits are encountered with parameter read-outs above the predetermined threshold levels.

BRIEF DESCRIPTION OF THE DRAWING

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein.

DESCRIPTION OF THE PREFERRED EMBODIMENTS

Typical signal parameters measured

The monitoring system preferably employs an analyzer which simultaneously measures several signal parameters or characteristics. These parameters are chosen with a particular view toward providing an early indication of a deterioration of the circuit to permit a repair of a circuit switch before the circuit quality becomes unacceptable.

Figures 1, 2:
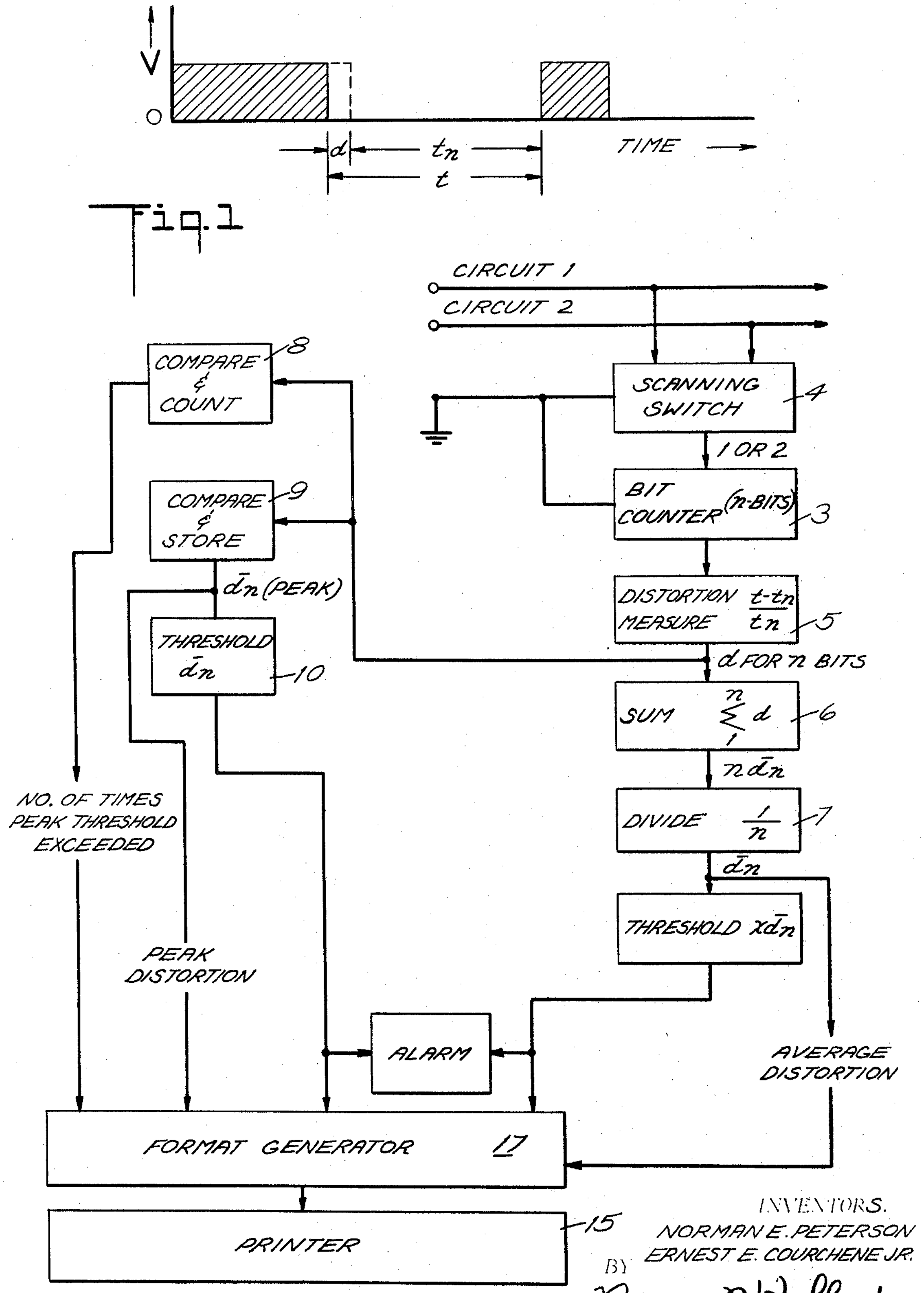
FIG. 1 is a diagrammatic illustration of a signal pulse of one type monitored by the process of the present invention.
FIG. 2 is a diagrammatic showing of a typical system for performing the monitoring process.

While a variety of signal forms are in use and analyzing means can be employed within the circuit for detecting useful measurements on each type of signals, the bulk of present high-speed communications use coded two level signals where the information is encoded as illustrated in FIG. 1 to consist of intermittent off-and-on conditions that are known as bits. These bits are the on and off periods which when illustrated on a time voltage basis may be shown diagrammatically as illustrated in FIG. 1.

Several significant parameters or measurements will now be described in connection with a typical high-speed communication or computer signal using such bits and in which the time between voltage pulses is known as a space and the voltage portion is known as a mark.

The basic measurement on such systems which is of value in itself and which is used to provide the additional parameters, as will be described, is known as the signal distortion. The distortion is most effectively measured as the difference in length of the actual signal pulses or spaces as compared with their nominal length and expressed as a percentage, i.e.

$$d=\frac{t-t_n}{t_n}$$

$$d\%=100d$$

where:

$d$ is the relative distortion;
$d\%$ is the percentage distortion;
$t$ is the actual length of the pulses; and
$t_n$ is the nominal pulse length.

This measurement has the advantage that the distortion can be measured as a pure number regardless of the particular length of the mark or space being measured. It is preferable to measure the distortion of the space in most systems since many systems use codes wherein the mark length differs from bit to bit whereas the nominal space length is a constant value.

Three significant measurements are derived in a preferred signal analyzer for use in the system and they will now be described in connection with FIG. 2 which is a diagrammatic showing of the circuit for producing these measurements.

At the top of FIG. 2 two circuits 1 and 2 are shown which are transmitting signals including marks and spaces and where the nominal space has a predetermined length. The two circuits are alternately coupled to a counter 3 by a scanning switch 4. The counter 3 is set to count a predetermined number of spaces and feeds them to a distortion measuring or analyzer 5 which measures the distortion for each space and which feeds this distortion into a further circuit 6 for forming a sum of the distortion of the predetermined number of spaces. This sum is now divided in the divider 7 to provide an output whose amount is equal to the average distortion of the signal spaces for the number measured. As indicated above, this average distortion may be used to operate an alarm or a printer output so that the output of the divider may also be fed through a threshold circuit which will produce an output signal when the average distortion exceeds the preset threshold level to provide the desired alarm, read-out, or other control signal. The distortion output from the distortion measuring circuit 5 may also be used to provide an output known as a hit to provide a reading known as the number of the hits which is a pure number indicating the number of times that the distortion value for any pulse exceeds a predetermined threshold. This measurement is obtained by passing the output of the distortion circuit 5 for each of the spaces measured through a compare and count circuit 8. The compare and count circuit 8 is set to count the number of times the distortion exceeds the predetermined threshold.

The output of the distortion measure circuit 5 is also used to determine a parameter measure known as the peak distortion which is the peak reading for the number of spaces measured. This is obtained by feeding the distortion value to a comparing and storing circuit 9 and by including an output which will carry the largest distortion fed to this compare and store circuit 9. This peak distortion may also be fed through an additional threshold 10 where it is desired to actuate an alarm, read-out, or other control in the event this peak distortion exceeds a predetermined amount.

In addition to the above described measurements based upon distortion of the signal spaces or marks, signals of this type may also be fed into an analyzer which produces a measurement of the pulse shape which may be expressed in the form of the rise time for the signal transmission presented as a percentage of the mark time. The signal reading level may be a simple indication of signal amplitude and where a preset threshold may be used to also activate an alarm or readout or other control means in the event the amplitude reaches above or falls below predetermined threshold amplitude settings.

The monitoring system

Figure 3:
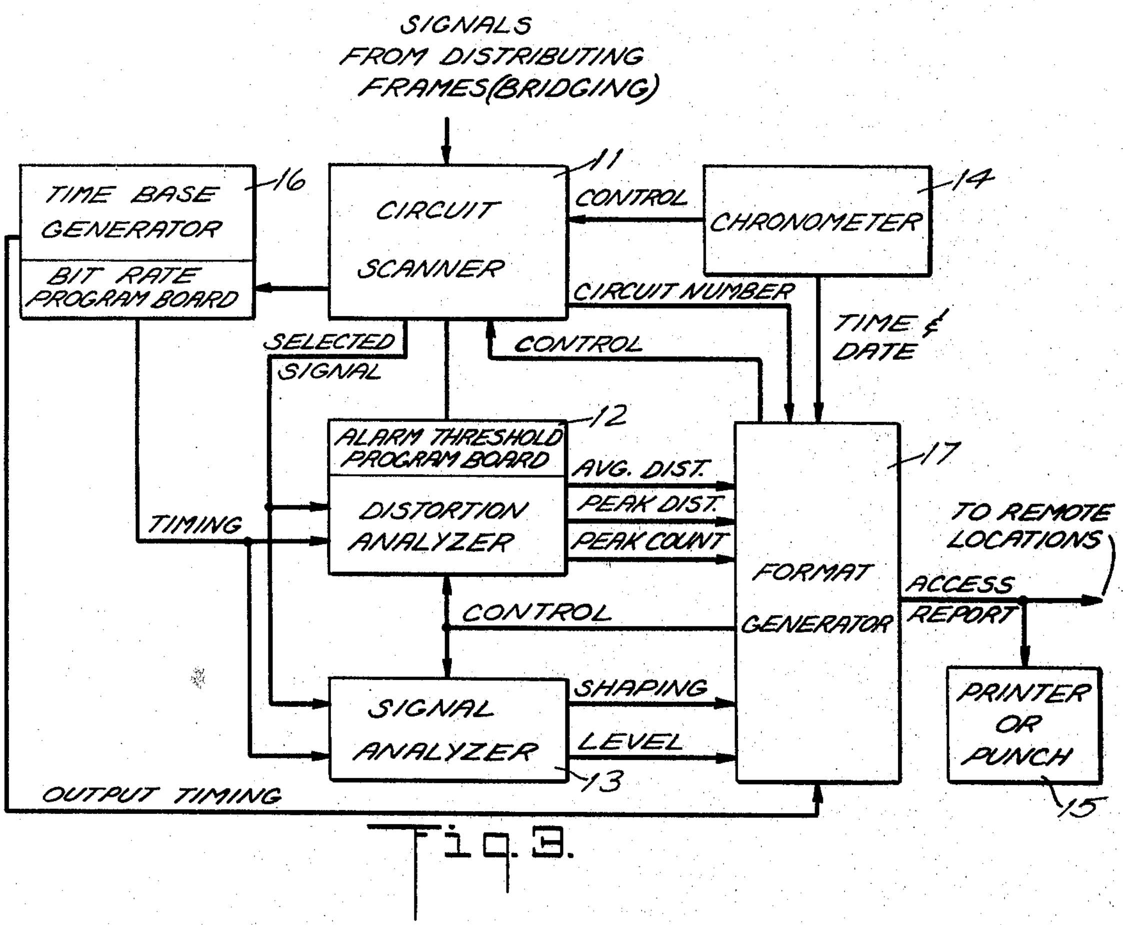
FIG. 3 is a schematic block diagram of a preferred embodiment of the monitoring system.

A preferred monitoring circuit is illustrated in FIG. 3. This monitoring circuit is capable of monitoring a large number of circuits and may be used, for example, to continuously monitor typical circuit installations including 40 to 400 circuits or points of circuits and to provide instantaneous warning signals for deteriorating circuits and alternatively to provide printed and coded recordings of all or some of the circuits monitored. As will be more fully described below, a suitable format generator may be connected to a printer such as a teleprinter or tape punch to record signal characteristics whenever an unsatisfactory circuit is sampled or the printer may be activated from time to time to provide a written read-out on each of the circuits monitored giving a reading of the circuit number and the date and time of the sample and one or more significant recordings of the condition of the circuit, as, for example, the average distortion or the peak distortion or the hits as described above.

Figure 6:
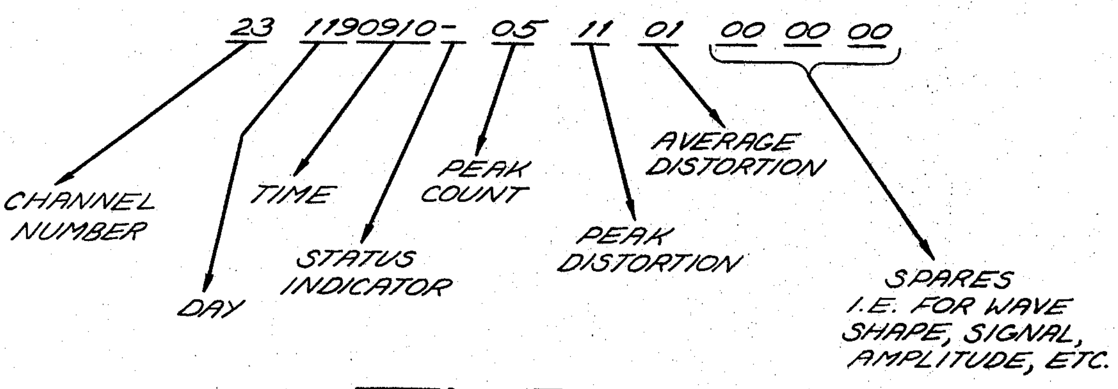
FIG. 6 is a typical teleprinter printed read-out from the preferred system.

FIG. 6, for example, illustrates a typical teleprinter output illustrating the recording of the condition of a circuit with the readings as indicated. A circuit operator or supervisor or maintainer can quickly determine the condition of a large number of circuits by scanning such print-outs and will be able to determine those circuits which are unsatisfactory as well as those where the reading indicate a possible deterioration which may lead to subsequent failure and which by bing detected promptly may be prevented.

FIG. 3 includes a circuit scanning device or switch 11 which provides the bridge between the signal analyzers 12 and 13 and the circuits being monitored. Such a circuit scanner may be designed, as is the case of the preferred embodiment described below, to operate through a resistive or other isolating coupling to the operating circuits so that the scanning has no significant effect on the circuits being monitored. This permits each of the circuits to be coupled into the analyzers without interruption. The coupling resistor, for example, may be about 50,000 ohms. Where a common return is used, no further coupling is needed and on other circuits the sensing point is coupled to the scanning system through a pair of wires. The function of the scanner is to provide an output signal for the analyzer portion of the circuit which consists of successive samples of each of the lines or circuit points being monitored. Thus, in a typical circuit monitoring 150 separate circuits, the circuit scanner output is successively switched to each of the 150 circuits. Using a conventional solid state switching circuit, this switching may be performed to sample the entire 150 circuits each minute permitting the entire 150 circuits to be checked once per minute. The circuit scanner is controlled by a chronometer 14 which conveniently serves the additional function of providing the time signal for the above printing recorder 15. These functions are illustrated in FIG. 3 by the control coupling between the scanner 11 and the chronometer 14 and by the coupling between the chronometer and the teleprinter 15. The other basic circuits in the monitoring system include the signal analyzing circuits 12 and 13. One or more of these may be used to provide a particular reading desired and each of these analyzers has its input coupled to the scanner 11 to permit it to analyze the samples being furnished from each of the circuits. Since the analysis of each of the signals is based upon the signal value as well as the duration or time of the signal, a time base generator 16 is provided. The output of the generator 16 is a time signal corresponding to the time base being used for the particular channel being sampled. Where different communication circuits are operated on different time bases, it is necessary that the time bases be synchronized with the circuit being sampled. For this reason and as indicated, the time circuit is coupled to the time base generator so that the time base generator 16 is switched by the scanner 11 in synchronism with the scanned signals to vary time base fed to the analyzers 12 and 13 as necessary.

One signal analyzer as illustrated in FIG. 3 includes an alarm threshold program board. The threshold program board by being coupled to the scanner permits a threshold to be set for each circuit to indicate a circuit failure or a circuit deterioration for the particular circuit being analyzed. Three typical signal values are shown at the analyzer 12 output which are measured by this portion of the circuit. These readings which are average distortion, peak distortion, and hits have been described above. In each case, the predetermined threshold values for these signal parameters may be set in the analyzer 12 so that the analyzer warning signal output is only operated where the particular signal exceeds the preset threshold value. Alternatively, each of the readings may be coupled directly to the formal generator 17 and thence to the printer 15 so that a recording may be made of circuit operation for analysis such as circuit utilization regardless of whether or not the circuit is operating properly or improperly.

The samples of the signals from each of the circuits or circuit points may be also analyzed for other characteristics which are not used to trigger warning devices but which are of value in checking circuit operation and which for this reason are coupled directly through the format generator 17 to the printer 15. These outputs, for example, may be readings of the signal mark shape and signal mark level. The above mentioned format generator 17 is a circuit which receives each of the above mentioned signals such as the time and date and the circuit number and the signal analyzer readouts and which converts the particular read-out format being fed to it in each case to the necessary format or code to operate the teleprinter or tape punch or other recording device 15.

The analyzer output signals which are used to monitor the performance of the circuits and which are generated by the analyzers 12 and 13 will now be further described and the preferred embodiments of the principal elements of the above described circuit will also be further described. Portions of the circuit such as the power supply, the chronometer, the switch scanner, and certain other circuits within the other elements need not be further described as a variety of conventional and suitable circuits for these portions are well-known or commercially available for insertion in the system as described.

The distortion analyzer

Figure 4:
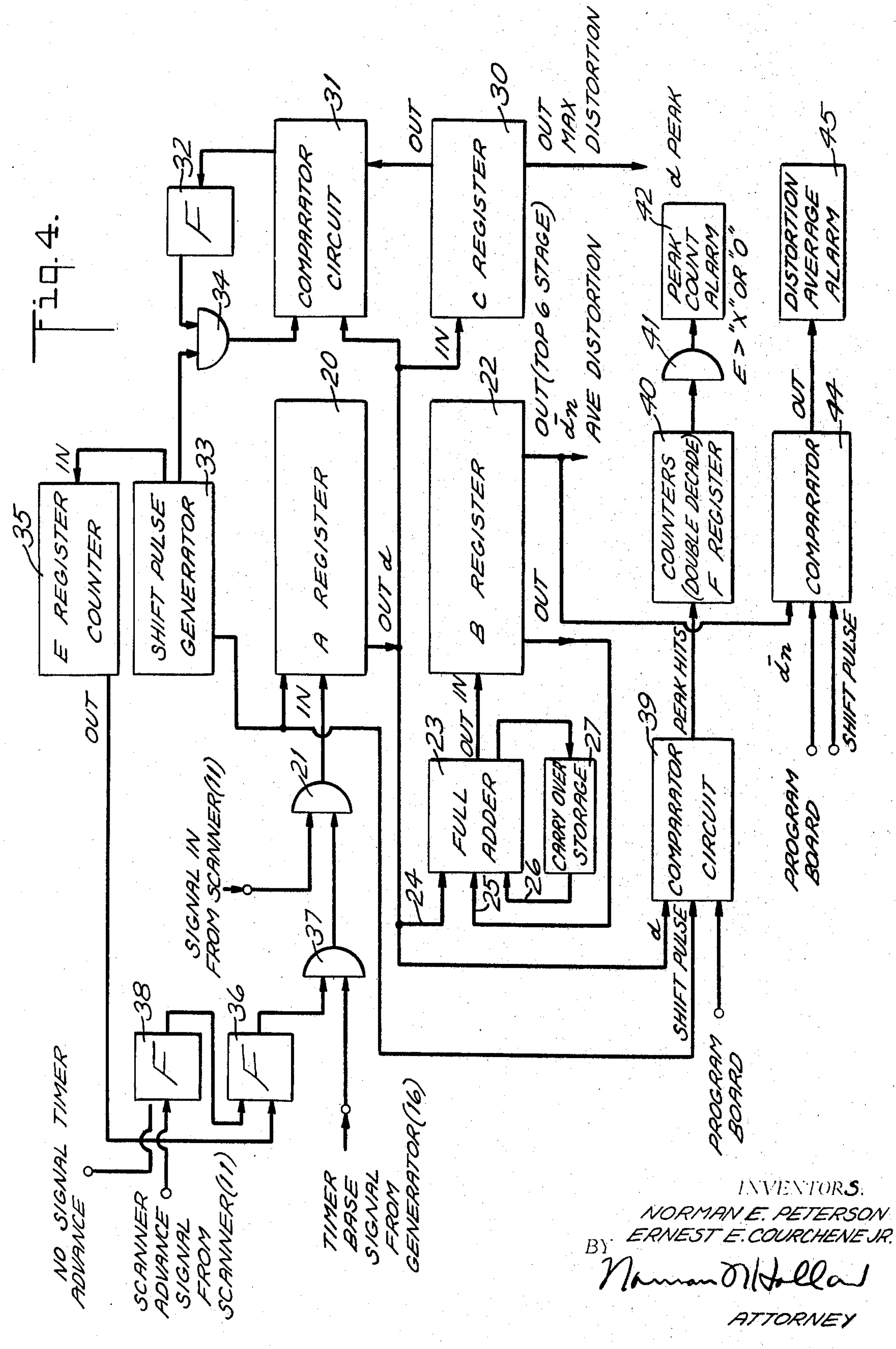
FIG. 4 is a schematic illustration of a preferred embodiment of a signal analyzer in accordance with the present invention.

A group of preferred parameters were described above several of which are based upon a measurement of the bit distortion, i.e. the variation of the length of a signal mark or space. An analyzer will now be described with particular reference to FIG. 4 which generates a number corresponding to the signal space distortion and which then also provides the average distortion of a predetermined number of spaces as well as providing the value of the maximum or peak distortion of the group of spaces measured.

The first circuit employed for measuring the space distortion will be designated as the A register 20. This is a reversal binary counter set up to count in pure binary code from zero up to fifty and back to zero. The time base counter 16 (FIG. 3) is coupled through a gate 21 into the A register 20. This time base counter has been automatically set by the bit rate program board to provide a count of 100 during the nominal space interval for that particular circuit. It is thus clear that this count fed into the A register over a signal space of proper length for this circuit causes the A register to count from zero to fifty and back to zero. A space of proper length would thus terminate the counting at zero indicating that there is no distortion. On the other hand, a short space would terminate the counting prematurely with a count in A register corresponding exactly to the distortion. Similarly, a long space would permit the count to proceed a similar additional count corresponding to the percentage of distortion. This result is obtained by coupling the input signal from the scanner 11 (FIG. 3) to the gate so that the gate passes the count after a transition from mark to space and the signal closes the gate when the transition from space to mark occurs. Six binary stages are provided to permit the maximum distortion count of 50 and a seventh flip-flop stage is included to switch the counter from its count-up to its count-down and vice versa. Thus, each space for the signal being fed to the A register 20 by the scanner 11 forms a count in the A register equal to the percentage space distortion.

As already indicated, a useful parameter in evaluating the circuit is an average distortion taken over a number of signal spaces. A convenient number for producing a useful average has been found to be 32 spaces and it is therefore necessary to transfer the individual distortion readings from the A register for 32 successive spaces to a second register indicated for convenience as the B register 22. In order to provide an adequate capacity for 32 successive distortion readings from the A register 20, the B register 22 is a right shift register having 11 binary stages.

The B register records the sum of 32 distortion readings as transferred from the A register and the average distortion is obtained from this sum by dividing the stored number by 32. Since the B register has pure binary stages, this division is conveniently performed by taking the recorded number less its left 5 stages.

After the A register 20 has measured the distortion for a space, the signal transition from space to mark is used to initiate a transfer of the distortion reading from the A register 20 to the B register 22. The A register 20 is coupled to the B register 22 through the usual full adder 23. the full adder has the usual three input including an input 24 from the A register 20 output, an input 25 from the B register output, and a third input 26 coupled to its own output through a carry-over storage circuit 27. The second output of the full adder 23 is coupled to the input of the B register. In transferring the distortion for the individual spaces to the B register 22, the A register 20 is shifted to the left as 6 digits on the A register 20 are shifted serially into the full adder 23. Simultaneously, the B register 22 is shifted to the right through the B adder input and the sum of these two amounts is fed into and stored in the B register 22 and any carry which results from the summation of the A and B register outputs is stored in the carry-over storage circuit 27. The A register 20 and the B register 22 are then again shifted to the left and to the right respectively and the second order of digits are entered along with any carry resulting from the summation of the first order of digits and that in turn is put into the B register 22. When the A register 20 finishes the left shift of its previous measurement through the adder to the B register 22 it has a zero on its output.

This measuring operation is performed 32 times for 32 successive signal spaces and at the end of the 32 operations the sums of the distortions measure for 32 pulses will be stored in the B register 22. The average value of this sum may be now conveniently obtained by taking the top six places out of the B register and by dropping the five bottom places. In other words, the binary sum in the B register is divided by 32 in this manner.

As already indicated another desirable parameter for determining the condition of a circuit is a peak distortion reading for each group of 32 distortion readings as recorded on the A register 20. This parameter is obtained in the C register 30 which is a right shifting binary register having its output coupled to a comparator circuit 31. The output of the A register is fed both to the input of the C register and to the comparator circuit 31 to permit a comparison to be made between the previous distortion value already set into the C register and a succeeding distortion value. The comparator 31 output operates a flip-flop circuit 32 to control feeding of shift pulses from the shift pulse generator 33 into the C register. This flip-flop 32 opens a gate 34 only in the event the new A register 20 output is greater than the prior distortion value already stored in the C register 30. The right shifting C register 30 will only receive the new A register 20 output when the C register 30 simultaneously is fed by the shift pulse generator 33 through open gate 34. It is therefore clear that the C register 30 retains the highest distortion value fed to it and rejects all subsequent values which are of lesser value.

A counter designated as the E register 35 is coupled to the shift pulse generator 33. The E register 35 is set to count up to the number of marks being measured by the A register 20, as for example, 32 marks in the system being described. When the E register 35 reaches the full count, it shuts down the entire analyzer operation by cutting off the flow of time base counting signals into the A register 20 through the flip-flop 36 and its associated gate 37.

The analyzer is activated for the above described operation through another flip-flop 38 coupled to the above described flip-flop 36. The flip-flop 38 is fed from the scanner 11 to receive the scanner advance signal. Flip-flop 38 is triggered one way by the scanner advance signal which is a preparatory condition preparing the circuit for its analyzing operation. The flip-flop 38 is coupled to the flip-flop 36 which is then turned over by the time base signal itself. The second flip-flop 36, as already indicated, is coupled to the gate 37 to reopen it to again admit the time base through the gate 21 controlled by the scanner 11 signal. Thus, the time base signal is fed through the two gates 21 and 37 into the A register 20 at the proper time commencing when the circuit being scanned transmits a mark to space transition.

The top six stages of the B register 22 now contain the average value of the distortion $\bar{d}_n$ and in the C register 30 is stored a value equal to the maximum distortion (*d* max.) of the 32 bits analyzed.

A third parameter which is of value in determining the signal condition is known as the peak count which is the number of bits among the 32 bits measured which have a distortion value above a preset level.

This parameter is obtained by the use of an additional comparator circuit 39 which is coupled to the bit rate program board which is set for the peak distortion value to be used for that circuit for the peak count value. Another comparator input is coupled to the output of the A register 20 to permit the comparator 39 to make a comparison between that particular bit distortion and the pre-programmed value from the program board. A space to mark transition signal from shift pulse generator 33 is coupled to the comparator 39 activator to cause it to read out a count at the termination of the space being analyzed if the space distortion read out of the A register 20 is greater than the pre-programmed value and this count is fed to an F register counter 40 consisting of two decade counters which register up to 32 counts.

When the E register 35 shuts off the analyzer after 32 counts, the F register will contain the peak count showing how many of the space bits measured have distortions greater than the pre-programmed peak value. This number may be fed through a gate 41 to an alarm 42. The gate 41 may be set to close for a peak count of one or another preset value.

In order to generate an alarm signal in connection with the average distortion as obtained in the B register 22, an additional comparator 44 is provided which is fed a predetermined threshold average value as set up on the threshold program board for that particular channel. The average distortion value fed into this comparator 44 from the B register 22 is compared with the threshold and if it exceeds the threshold an average distortion alarm signal is generated by the comparator 44 for use in activating an average alarm 45 or a read-out of that particular average value if desired.

When the above readings are obtained and the comparators 31, 39, and 44 are activated by a space to mark transition after the 32nd count, the end of the analysis has been reached and the circuit evaluation is now determined on the basis of the numbers obtained. If there are no peak count or average or other alarm signals, the scanner is advanced by an appropriate scanner advancing signal. If on the other hand one or more alarm signals have been fed out, the information obtained may now be fed to a format generator to be encoded for a teletypewriter or punch machine read-out or alternatively and in order to obtain a more reliable indication of what problems may exist the alarm signals may be used to delay the advance of the scanner and to initiate a second and a similar analysis of the signal on the same circuit.

The format generator

As already indicated, the present circuit is adapted for providing what is known as a hard copy read-out which may be a teletypewriter as illustrated or another recording device using punch tapes or punch cards.

The information on the B, C, and F registers as well as the output of the chronometer and the circuit scanner is converted to the proper printing code for the read-out device.

Figure 5:
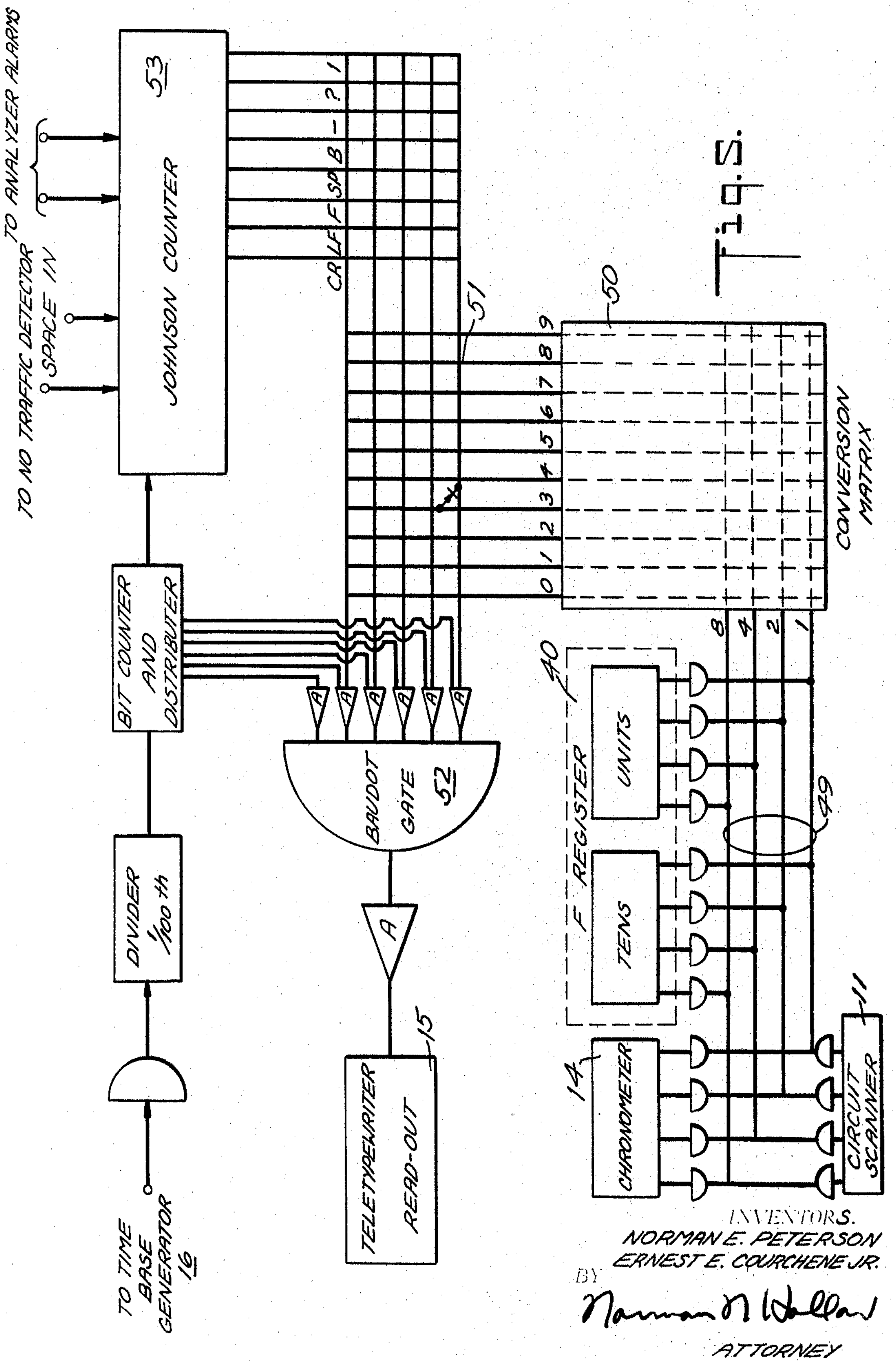
FIG. 5 is a schematic illustration of a preferred embodiment of a format generator.

This is done by a format generator which is coupled into the circuit as illustrated in FIG. 5.

A preferred form of such a format generator is used with the analyzer described above and will now be described with particular reference to FIG. 5.

For reasons already indicated, the values to be printed out have been registered in differing codes or systems. The average distortion formed in the B register, for example, is encoded in a pure binary code. The peak or maximum distortion value indication in the C register is also a binary code while the peak count indicating a number of distortion readings exceeding the peak count threshold is in a binary coded decimal. The chronometer output indicating the time and date as well as the scanner circuit number indication is also in binary coded decimal. These five signals are converted in the format generator to the proper output code which in the circuit to be described is for use with a teletypewriter.

FIG. 6 shows a typical teletypewriter read-out for one channel, i.e. a channel designated channel 23 with the various reading as already described above identified in FIG. 6.

When a teleprinter is used, it is necessary to convert the above described values to a common format which is in turn converted to the particular teleprinter code being used. A common teletypewriter code is the baudot code being used. A common teletypewriter code is the code which is based upon variations of five successive bits. The typical teletypewriter read-out illustrated in FIG. 6 may conveniently first show the channel number which is being evaluated and then the date and time before indicating the additional circuit parameters obtained. FIG. 5 illustrates a preferred circuit for generating the baudot code for the teletypewriter 15.

The circuit scanner 11 generates a binary coded decimal corresponding to the circuit number which has been switched to the analyzers 12 or 13. The chronometer 14 also has a binary coded decimal output indicating the time and date. These binary coded signals as indicated in FIG. 5, are successively coupled through the indicated gates and bus 49 to the conversion matrix 50 including the program matrix 51 and a baudot OR gate 52 for the teleprinter 15.

The gates associated with the scanner circuit 11 channel number output and the chronometer 14 are opened to perform the initial channel number, day, and time read-out and then the peak count, the peak distortion, and the average distortion values are fed through the format generator to the teleprinter 15.

After the channel number and chronometer print-out, the preferred information provided by the teleprinter 15 includes a symbol indicating the status of the particular circuit being evaluated. These symbols may include an alarm indication such as the peak count alarm 42 or the average distortion alarm 45 described above. The control signals for these alarms are also fed into a Johnson counter 53 and thence through the distribution matrix 51 to be encoded into an alarm signal such as the bell symbol indicated by a B on one of the Johnson counter outputs.

Where a transition signal is obtained at the shift pulse generator 33 (FIG. 4) indicating that the channel being scanned is carrying traffic, the shift pulse output may also be coupled into the Johnson indicator to provide an indication of traffic on the line. This output may be a dash symbol as also illustrated adjacent to one of the Johnson counters 53 outputs causing a dash to be printed-out as illustrated at this position in the read-out shown in FIG. 6. If desired, an additional symbol, shown in the present case to be a question mark, may be used to indicate no traffic on the line being evaluated. A no traffic detector may consist of a timer coupled to the shift pulse 33 generator output and preset to provide a no-traffic signal pulse if no shift pulse is received by the timer in a predetermined period. Such a detector input is shown for the Johnson counter 53 to provide the question mark no traffic symbol. Other circuits may be used on the Johnson counter 53 to provide other marks such as the slant symbol illustrated on the last Johnson counter output and to give other indications or to record specific alarm situations.

After the status is printed out, a space signal is fed through the Johnson counter and then the peak count on the F register 40 is fed through the format generator.

As already described, the peak count has been obtained and stored on the F register 40 in two decade counters in binary coded decimal form. The peak count may now be fed through the conversion matrix 50, 51 first feeding the tens count and then the unit count through the F register 40 output gates and through the matrix 50, 51 and the baudot gate 52 to obtain a print-out of the peak count.

After the two digit peak count is read out, a space signal is again applied through the gate 52. During this interval, the F register 40 is cleared and may be used in the following manner for converting the peak distortion reading in the C register 30 (FIG. 4) from pure binary code to a binary coded decimal for subsequently being fed onto the conversion matrix bus 49. This conversion is performed by clearing the A register which is no longer needed for the evaluation of the channel because its output has now been fed into the B register. Since the A register is a right-shifting register, the binary number present in the C register may be fed into the A register. This count in the A register 20 (FIG. 4) is next carried to zero and then cut off. The count carrying the A register to zero is simultaneously fed into the F register 40. When the A register 20 reaches zero, it is clear that a count will have been fed into the F register 40 which will be a binary coded decimal corresponding to the maximum distortion originally registered in the C register 30.

After the binary coded decimal value for the peak distortion is fed onto the number bus 49 and through the conversion matrix 50, 51 and to the printer 15, another space is fed to the printer. While this space is being printed, the average distortion which is in the B register 22 is converted to a binary coded decimal in the same manner as described above for the peak distortion. Thus, the B register 20 value is fed into the right shifting A register as the A register 20 is shifted 6 times. The average value is now fed into the A register 20 which is now set to count down and as it counts down the count is also fed into the E register 40. By the time that the format reaches the point that it wants the tens average value, the average distortion number is in the E register. The value may now be transferred through the common number bus 49 through the conversion matrix 50, 51 to the teleprinter 15 to provide the evaluation average distortion print-out.

As described above, each of the necessary values for use in the teletypewriter 15 print-out has now been made available in binary coded decimal form for conversion in the format generator to the baudot teletypewriter code. The conversion matrix illustrated at 50, 51 is of the known type for transferring a binary coded decimal number to the five element baudot code. As these values including the channel number, day and time and the various distortion values are all formed from numbers from 1–10, the conversion matrix 50, 51 is set up for converting zero and the digits 1–9 to the baudot code for these digits.

Control signals for initiating the print-out under the control of the Johnson counter 53 may be obtained by feeding the time base signal from the time base generator 16 (FIG. 3) for the particular channel being evaluated through a divider 54 which in the case of the 100 count analyzer system described above divides the time base by 100. The output of this divider may also be conveniently used as a start control signal for the teletypewriter by having the divider output coupled into the baudot OR gate 52.

It will be seen that an improved automatic circuit evaluation system has been provided. This system provides a novel combination of related features which make the system particularly well suited for the continuous evaluation of a large number of circuits and circuit points. Of particular value is the adaptation of the system for reading certain circuit parameters which give not only an instant indication of a circuit failure but which also provide for a preliminary or early warning indicating that a particular circuit may be deteriorating. The system combines this feature with a print-out system which is ideally suited for detecting deteriorating circuits as the printer may be adjusted to identify and print-out the chosen parameters only where they are falling below accepted standards. While a continuous print-out may be provided if desired, the preferred operation provides a print-out with or without an additional warning in the case where a circuit has failed or may be in the process of failing. This permits the circuit operator to repairman to quickly identify any circuits which may be in trouble and eliminates the necessity for his reviewing a large amount of printed-out material which may relate only to properly operating circuits.

The system also is ideally suited for evaluating a relatively large number of circuits as it includes a cooperating programming system which will adjust the signal characteristics such as the bit rate individually for each of the numerous circuits being evaluated so that channels carrying different code systems may be included. In addition, the programming board using much of the same circuitry may also provide adjustable threshold signals for use in discriminating between objectionable and unobjectionable variations in the various circuit characteristics or parameters being evaluated.

The above described combination of selective readout and the use of particular parameters together with a variable threshold coupled to the read-out system provides an extremely selective evaluating system so that the read-outs are reduced to a minimum number. In contrast with present circuit evaluating systems, the present system provides a workable evaluation system where the relatively few number of alarms or read-outs each can be evaluated by the maintenance personnel and acted upon. This eliminates the continuous printer read-outs which prevent effective circuit evaluation as is the case with present systems and where the large number of alarms cause maintenance personnel to largely ignore the automatic system due to their inability to make intelligent assessments of the excessive number of alarms.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. An electrical signal circuit monitoring system for monitoring a plurality of circuits comprising the combination of means for analyzing an electrical signal for forming a signal distortion value, means for successively coupling the circuits to the analyzing means, alarm means, means for generating a plurality of alarm threshold values, means including said alarm threshold generator for selectively coupling the distortion value output of said analyzing means to said alarm signal means, a printer operable by a pulse coded electric signal, and means for coupling said distortion value to said printer including means for transforming said signal distortion value to a reading in said pulse coded electric signal.

2. The monitoring system as claimed in claim 1 in which said analyzer further comprises counting means, means for initiating said counting means activated by a mark to space transition in a mark and space pulse coded electrical signal, and means to stop said counting means activated by a space to mark signal whereby the space length distortion is represented by a count.

3. The monitoring system as claimed in claim 1 in which said circuit coupling means comprises a passive connection with each circuit whereby said monitoring does not affect signal transmission on the monitored circuits.

4. The monitoring system as claimed in claim 1 in which said analyzing means comprises means for generating a measure of the peak count for a predetermined number of bits in a monitored circuit carrying a pulse coded signal.

5. The monitoring system as claimed in claim 1 in which said analyzing means comprises means for generating a measure of the peak distortion for a predetermined number of bits in a monitored circuit carrying a pulse coded signal.

6. The monitoring system as claimed in claim 1 in which said analyzing means comprises means for generating a measure of the average distortion for a predetermined number of bits in a monitored circuit carrying a pulse coded signal.

7. The monitoring system as claimed in claim 1 in which said read-out means comprises a teleprinter.

8. A system for monitoring a plurality of electric circuits carrying coded signals comprising the combination of signal analyzing means for forming a plurality of predetermined distortion parameters, scanning means for successively coupling the analyzing means to the circuits, and means for controlling the scanning means advance in accordance with the parameter read for the individual circuits.

9. The system as claimed in claim 8 in which said means for controlling the scanning means includes a distortion threshold programmer.

10. The monitoring system as claimed in claim 8 in which said signal analyzing means further comprises counting means, means for initiating said counting means activated by a mark to space transition in a mark and space pulse coded electrical signal, and means to stop said counting means activated by a space to mark signal whereby the space length distortion is represented by a count.

11. Means for providing a warning control signal indicating circuit deterioration for individual circuits in a plurality of circuits transmitting information in the form of a series of pulses of predetermined lengths comprising the combination of means for measuring the distortion of pulse lengths of a group of pulses from a signal on a normal circuit, means for scanning the plurality of circuits for periodically connecting each circuit to said pulse distortion measuring means for measuring pulse distortion in the individual circuits, and means for forming a control alarm signal when the measured distortion for the group of pulses of any circuit exceeds significantly a predetermined threshold value.

12. The means as claimed in claim 11 in which the measuring means measures the average distortion for the said group of pulses.

13. The means as claimed in claim 11 in which the measuring means measures the peak distortion of the pulse distortion for the pulses of said group.

14. The means as claimed in claim 11 in which the measuring means measures the number of pulses in the said group of pulses for which the distortion exceeds a predetermined amount.

References Cited

UNITED STATES PATENTS

| | | | |
|---|---|---|---|
| 3,025,349 | 3/1962 | Peterson | 178—69 |
| 3,293,605 | 12/1966 | Moore | 340—412 |
| 3,349,374 | 10/1967 | Gabrielson et al. | 178—69 |

THOMAS A. ROBINSON, Primary Examiner

U.S. Cl. X.R.

340—163, 412